United States Patent
Horng et al.

(10) Patent No.: US 7,630,176 B2
(45) Date of Patent: Dec. 8, 2009

(54) SEED LAYER FOR FABRICATING SPIN VALVE HEADS FOR ULTRA-HIGH DENSITY RECORDINGS

(75) Inventors: Cheng T. Horng, San Jose, CA (US); Hui-Chuan Wang, Pleasanton, CA (US); Ru-Ying Tong, San Jose, CA (US); Chyu-Jiuh Torng, Pleasanton, CA (US)

(73) Assignee: Headway Technologies, Inc., Milpitas, CA (US)

( * ) Notice: Subject to any disclaimer, the term of this patent is extended or adjusted under 35 U.S.C. 154(b) by 230 days.

(21) Appl. No.: 11/804,271

(22) Filed: May 17, 2007

(65) Prior Publication Data

US 2007/0220740 A1    Sep. 27, 2007

Related U.S. Application Data

(62) Division of application No. 10/308,597, filed on Dec. 3, 2002, now Pat. No. 7,234,228.

(51) Int. Cl.
G11B 5/33    (2006.01)
(52) U.S. Cl. .................................. 360/324.11
(58) Field of Classification Search ............. 360/324.1, 360/324.11, 324.12, 315, 123.45; 29/603.08
See application file for complete search history.

(56) References Cited

U.S. PATENT DOCUMENTS

| | | | |
|---|---|---|---|
| 5,731,936 A | 3/1998 | Lee et al. | |
| 6,046,892 A | 4/2000 | Aoshima et al. | |
| 6,141,191 A | 10/2000 | Lee et al. | |
| 6,175,476 B1 | 1/2001 | Huai et al. | |
| 6,222,707 B1 | 4/2001 | Huai et al. | |
| 6,322,911 B1 | 11/2001 | Fukagawa et al. | |
| 6,495,275 B2 * | 12/2002 | Kamiguchi et al. | 360/324.11 |
| 6,661,622 B1 * | 12/2003 | Pinarbasi | 360/324.1 |
| 6,785,954 B2 | 9/2004 | Horng et al. | |
| 6,980,405 B2 * | 12/2005 | Choe | 360/324.12 |
| 7,042,684 B2 * | 5/2006 | Horng et al. | 360/324.1 |
| 7,086,141 B2 * | 8/2006 | Tsuchiya et al. | 29/603.14 |

(Continued)

OTHER PUBLICATIONS

"Magnetoresistance of Symmetric Spin Valve Structures", by Thomas C. Anthony et al., IEEE Trans. on Magnetics, vol. 30, No. 6, Nov. 1994, pp. 3819-3821.

(Continued)

*Primary Examiner*—Angel A. Castro
(74) *Attorney, Agent, or Firm*—Saile Ackerman LLC; Stephen B. Ackerman

(57) ABSTRACT

A method for forming a bottom spin valve sensor element with a novel seed layer and synthetic antiferromagnetic pinned layer and the sensor so formed. The novel seed layer comprises an approximately 30 angstrom thick layer of NiCr whose atomic percent of Cr is 31%. On this seed layer there can be formed either a single bottom spin valve read sensor or a symmetric dual spin valve read sensor having synthetic antiferromagnetic pinned layers. An extremely thin (approximately 80 angstroms) MnPt pinning layer can be formed directly on the seed layer and extremely thin pinned and free layers can then subsequently be formed so that the sensors can be used to read recorded media with densities exceeding 60 Gb/in$^2$. Moreover, the high pinning field and optimum magnetostriction produces an extremely robust sensor.

10 Claims, 1 Drawing Sheet

U.S. PATENT DOCUMENTS 7,099,124 B2 * 8/2006 Mizuguchi ............. 360/324.12
7,234,228 B2 * 6/2007 Horng et al. ............. 29/603.08
7,564,660 B2 * 7/2009 Horng et al. ........... 360/324.11

OTHER PUBLICATIONS

"Ptmn single and dual spin valves with synthetic ferrimagnet pinned layers", by Masamichi Saito et al., Journal of Applied Physics, vol. 85, No. 8, Apr. 15, 1999, pp. 4928-4930.

"Demonstration and Characterization of Greater than 60 $Gb/in^2$ Recording Systems", by K.Stoev et al., IEEE Trans. on Magnetics, vol. 37, No. 4, Jul. 2001, pp. 1264-1267.

"Optimizing the giant magnetoresistance of symmetric and bottom spin valves (invited)", by W.F.Egelhoff,Jr.et al., J. Appl. Phys. 79(8), Apr. 15, 1996, pp. 5277-5281.

* cited by examiner

SEED LAYER FOR FABRICATING SPIN VALVE HEADS FOR ULTRA-HIGH DENSITY RECORDINGS

This is a Divisional Application of U.S. patent application Ser. No. 10/308,597, filed on Dec. 3, 2002, now U.S. Pat. No. 7,234,228, which is herein incorporated by reference in its entirety, and assigned to a common assignee.

BACKGROUND OF THE INVENTION

1. Field of the Invention

This invention relates generally to the fabrication of a giant magnetoresistive (GMR) magnetic read head, more specifically to the use of novel seed layers in the fabrication of single and double spin valve sensors for reading ultra-high density recorded media.

2. Description of the Related Art

Early forms of magnetic read heads decoded magnetically stored data on media such as disks and tapes by making use of the anisotropic magnetoresistive effect (AMR) in magnetic materials such as permalloy. This effect was the change in the electrical resistance, r, of certain magnetic materials in proportion to the angle between the direction of their magnetization and the direction of the current flow through them. Since changing magnetic fields of moving magnetized media, such as magnetically encoded tapes and disks, will change the direction of the magnetization in a read head, the resistance variations of the AMR effect allows the information on such encoded media to be sensed and interpreted by appropriate circuitry.

One shortcoming of the AMR effect was the fact that it produced a maximum fractional resistance change, DR/R (where DR is the change in resistance between the magnetic material subjected to its anisotropy field, $H_k$, and the material subjected to zero field), which was only on the order of a few percent. This made the sensing process difficult to achieve with accuracy.

In the late 1980's and early 1990's the phenomenon of giant magnetoresistance (GMR) was discovered and soon applied to read head technology. The GMR effect derives from the fact that thin ($\cong 20$ angstroms) layers of ferromagnetic materials, when separated by even thinner ($\cong 10$ angstroms) layers of conductive but non-magnetic materials, will form ferromagnetic (parallel spin direction of the layers) or antiferromagnetic states (antiparallel spin direction of the layers) by means of exchange interactions between the spins. As a result of spin dependent electron scattering as electrons crossed the layers, the magnetoresistance of such layered structures was found to be significantly higher in the antiferromagnetic state than the ferromagnetic state and the fractional change in resistance was much higher than that found in the AMR of individual magnetic layers.

Shortly thereafter a version of the GMR effect called spin valve magnetoresistance (SVMR) was discovered and implemented. In the SVMR version of GMR, two ferromagnetic layers such as CoFe or NiFe are separated by a thin layer of electrically conducting but non-magnetic material such as Cu. One of the layers has its magnetization direction fixed in space or "pinned," by exchange anisotropy from an antiferromagnetic layer directly deposited upon it. The remaining ferromagnetic layer, the unpinned or free layer, can respond to small variations in external magnetic fields such as are produced by moving magnetic media, (which do not affect the magnetization direction of the pinned layer), by rotating its magnetization direction. This rotation of one magnetization relative to the other then produces changes in the magnetoresistance of the three layer structure.

The spin valve structure has now become the implementation of choice in the fabrication of magnetic read head assemblies. Different configurations of the spin valve have evolved, including the bottom spin valve, wherein the pinned layer is at the bottom of the configuration and the top spin valve, wherein the pinned layer is at the top. In addition, the qualities of the spin valve have been improved by forming the pinned layer into a synthetic antiferromagnet, which is a layered configuration comprising two ferromagnetic layers separated by a non-magnetic coupling layer, wherein the ferromagnetic layers are magnetized in antiparallel directions. The present challenge to the spin valve form of sensor is to make it suitable for reading recorded magnetic media with recorded densities exceeding 20 Gb/in$^2$. This challenge can be met by making the free layer extremely thin, for improved resolution in the track direction, while not reducing Dr/r, which is a measure of the sensor's sensitivity. One way of achieving this goal is by forming the spin valve on a seed layer, which is a layer of material whose purpose is to improve the crystalline structure of magnetic layers grown upon it. Many spin valves are formed on seed layers of Ta. Huai et al. (U.S. Pat. No. 6,175,476) disclose a synthetic spin valve sensor in which the seed layer can be Ta in a high resistivity phase. The present inventors have already shown that spin valves fabricated using a NiFeCr seed layer have a greatly enhanced GMR effect as measured by Dr/r. Presently, the NiFeCr seed layer is becoming the industry standard for heads capable of reading densities exceeding 20 Gb/in$^2$. The Cr composition of the seed layer in these heads is between 20 and 50 atomic percent, with the optimum value of Dr/r obtained with 40 atomic percent. Lee et al. (U.S. Pat. No. 6,141,191) disclose a top spin valve using a NiFeCr seed layer wherein the atomic percentage of Cr is between 20 and 50%. Lee et al. note a Dr/r for the configuration of 7.7%. Huai et al. (U.S. Pat. No. 6,222,707) disclose single and dual bottom spin valves using NiFeCr seed layers with a range of Cr atom percent between 20% and 50%, with approximately 25 atomic percent being preferred. They note an improvement in the texture of a synthetic antiferromagnetic pinned layer. The head so formed was characterized by DR/R between 9.42 and 10.19 and by sheet resistances between 12.77 and 14.9 . Subsequently, it was shown that a synthetic pinned layer spin valve head made with a NiCr seed layer having 40 atomic percent of Cr yielded better synthetic pinned layer properties than such a head made with a NiFeCr seed layer having 40 atomic percent of Cr. In a very early patent, Lee et al. (U.S. Pat. No. 5,731,936) provide such NiCr and NiFeCr seed layers in read heads using permalloy magnetoresistive elements. Aoshima et al. (U.S. Pat. No. 6,046,892) disclose a bottom spin valve read head with CoFeB free and pinned layers and using a Ta/NiFeCr seed layer wherein the Cr is at 24.3 atomic percent. Fukagawa et al. (U.S. Pat. No. 6,322,911) teach the formation of a seed layer to enhance the (111) crystalline orientation of subsequently deposited antiferromagnetic or ferromagnetic layer. Fukugawa teaches an NiCr or NiFeCr alloy with the addition of an element X of atomic percent between 0.1 and 15%, that will bond to oxygen more readily than the Cr.

A top spin valve read head with NiCr and NiFeCr seed layers has been commercially used for reading recorded densities between 10 and 20 Gb/in$^2$. This head has a free layer of NiFe(60 A)/CoFe(10 A) and a read head width of approximately 0.3 microns. For reading recorded densities of about 30 Gb/in$^2$, a NiCr seed layer with 40 atomic percent Cr still suffices when a NiFe(40 A)/CoFe(10 A) free layer is used together with a read head width of approximately 0.24 microns. For reading recorded densities of about 45 Gb/in², a NiCr seed layer with 40 atomic percent Cr is incorporated into a bottom spin valve configuration with a CoFeB(10 A)/NiFe (20 A) free layer and a read head width of approximately 0.17 microns. The configuration of this read head provides marginal performance in terms of signal-to-noise ratios and other benchmark parameters. To achieve capabilities of reading area densities exceeding 45 Gb/in², a magnetic read width of 0.15 microns or smaller is indicated along with an ultra-thin free layer of the form CoFeB(5 A)/NiFe(20 A). In addition, a thinner antiferromagnetic pinning layer of MnPt would be needed to reduce current shunting. A bottom spin valve configuration (see below) meeting these requirements has been produced with the following specific materials and thicknesses, yet its performance would be inadequate for reading area densities of 60 Gb/in²:

NiCr(40%)60/MnPt100/CoFe15/Ru7.5/CoFe20/Cu18/ OSL/CoFeB5/NiFe20/Ru10/Ta10.

In the above configuration the numbers (other than the 40%) refer to approximate thicknesses in angstroms. The NiCr seed layer has 40% atom percent Cr. MnPt is the antiferromagnetic pinning layer, CoFe/Ru/CoFe is the synthetic antiferromagnetic pinned layer, Cu is the spacer layer, OSL represents an oxygen surfactant layer formed on the Cu spacer layer, the surfactant layer being a sub-monolayer of oxygen deposited on the Cu surface by exposing the Cu layer to low-pressure oxygen in a separate chamber, CoFeB/NiFe is a composite free layer formed on the surfactant layer and Ru/Ta is a composite capping layer. The configuration provides a DR/R of 12.7% and a sheet resistance of 19.6

Clearly, to achieve acceptable performance for reading 60 Gb/in², a novel improvement of the configuration above will be required. It is the purpose of this invention to provide that improvement by the simple means of changing the seed layer from NiCr(40%) to NiCr(31%), which will also allow a thinning of the synthetic pinned layer. The head so formed will have a thinner free layer than any of those disclosed in the prior art cited above. Due to a significant reduction in the thickness of the antiferromagnetic pinning layer, the head will have a thinner overall profile. It will also have values of DR/R and sheet resistivity that indicate a higher sensitivity than the prior art heads cited above. The NiCr(31%) seed layer can also be incorporated into a symmetric dual spin valve configuration, in which a free layer is centered between synthetic antiferromagnetic pinned layers that are positioned above and below it. The novel seed layer allows such a dual configuration to be formed with sufficient overall thinness and sensitivity to meet the requirements of reading storage media with area densities exceeding 60 Gb/in².

SUMMARY OF THE INVENTION

A first object of this invention is to provide a method for forming a giant magnetoresistive (GMR) read head sensor element capable of reading recorded media having densities exceeding 60 Gb/in², along with the giant magnetoresistive (GMR) sensor element so formed.

A second object of this invention is to produce such a sensor that is robust and resistant to electrostatic discharge damage.

A third object of this invention is to provide such a GMR sensor element of a single bottom spin valve type and of a dual symmetric spin valve type, each having synthetic antiferromagnetic (SyAF) pinned layers, ultra-thin ferromagnetic free layers, ultra-thin antiferromagnetic pinning layers, very high values of DR/R and relatively high sheet resistance.

A fourth object of this invention is to provide a method for forming an ultra-thin symmetric dual spin valve having a high signal-to-noise ratio resulting from a high bias current due to low sheet resistance and a very high value of DR/R and capable of reading recorded densities of up to 100 Gb/in².

A fifth object of the invention is to provide, by means of the novel seed layer, the symmetrically placed SyAF pinned layers of the dual spin valve, an ultra-thin, yet robust sensor.

In accord with the objects of this invention there is provided in a first embodiment a single bottom spin valve sensor element formed on a novel GMR property-enhancing NiCr seed layer, wherein the Ni is approximately 69 atomic percent of the layer and the Cr is of approximately 31 atomic percent and the layer can be formed to a thickness of only 30 angstroms as compared to the 60 angstroms required for prior art seed layers of different Cr atomic percentages. The formation comprises a substrate, the novel seed layer formed on the substrate, an ultra-thin (approximately 60-100 angstroms) antiferromagnetic MnPt pinning layer formed on the seed layer, a synthetic antiferromagnetic (SyAF) pinned layer comprising a CoFe/Ru/CoFe tri-layer of the approximate dimensions 13 angstroms for the first CoFe layer, 7.5 angstroms for the Ru layer and 15 angstroms for the second CoFe layer, formed on the MnPt layer. A non-magnetic Cu spacer layer is then formed on the SyAF layer and an oxygen surfactant layer (OSL) is formed on the Cu layer. On this OSL, an ultra-thin ferromagnetic free layer is formed, said layer being either a CoFe/NiFe/Ru tri-layer in which the CoFe is approximately 5 angstroms thick, the NiFe is approximately 20 angstroms thick and the Ru is approximately 10 angstroms thick, or a CoFe/Cu bilayer, in which the CoFe is approximately 18 angstroms thick and the Cu is approximately 5 angstroms thick.

In a second embodiment there is provided a method of forming a symmetric dual spin valve sensor utilizing the same novel seed layer as in the first embodiment. To practice the method there is first provided a substrate. There is then formed upon the substrate the GMR effect-enhancing ultra-thin (approximately 30 angstroms) NiCr seed layer wherein the Ni is approximately 69 atomic percent and the Cr is approximately 31 atomic percent of the layer. There is then formed on this seed layer a correspondingly thin antiferromagnetic pinning layer of MnPt approximately 80 angstroms thick. On this pinning layer is then formed a first SyAF pinned layer, which is a tri-layer of CoFe/Ru/CoFe of the approximate dimensions 13 angstroms for the first CoFe layer, 7.5 angstroms for the Ru layer and 15 angstroms for the second CoFe layer. There is then formed on the SyAF a non-magnetic Cu spacer layer treated to form an oxygen surfactant layer (OSL). There is then formed on the OSL treated Cu layer an ultra-thin CoFe/NiFe/CoFe ferromagnetic free layer in which the first of the CoFe layers is approximately 5 angstroms thick, the NiFe layer is approximately 15 angstroms thick, and the second of the CoFe layers is approximately 3 angstroms thick, to complete a bottom spin-valve structure. There is then formed over this bottom spin-valve structure an OSL treated second Cu spacer layer, on which is then formed a second SyAF layer which is the mirror image of the first and a second MnPt layer approximately 70 angstroms thick to complete the symmetric dual spin valve. By reducing the thickness of the seed layer and the MnPt antiferromagnetic layer, a dual spin valve of only approximately 340 angstroms thickness can be formed. Moreover, the magnetostriction as measured by the coefficient lambda falls within the desirable range between 1.0E-06 and 2.0E-06, improving the output of the sensor. Such a thin sensor can easily fit between upper and lower magnetic shields in the read/write heads designed for ultra-high density recordings.

BRIEF DESCRIPTION OF THE DRAWINGS

The objects, features and advantages of the present invention are understood within the context of the Description of the Preferred Embodiment, as set forth below. The Description of the Preferred Embodiment is understood within the context of the accompanying figures, wherein.

DESCRIPTION OF THE PREFERRED EMBODIMENTS

Figure 1:
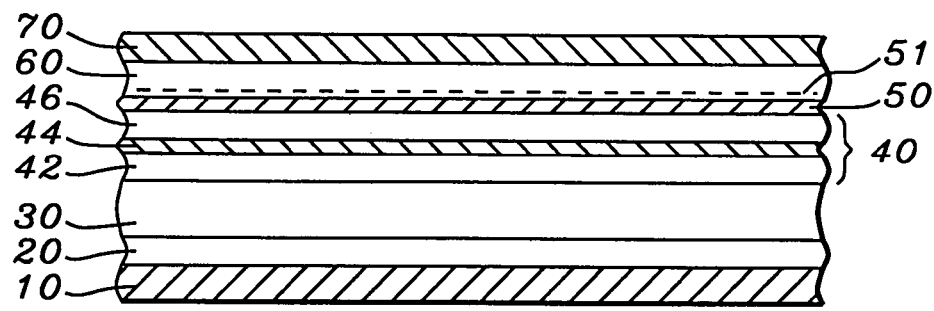
FIG. 1 is a schematic cross-sectional view of a single bottom spin valve sensor element formed in accord with a first embodiment of the method of the present invention.

The present invention provides, in a first embodiment, a method for forming a GMR bottom spin valve sensor element utilizing a novel ultra-thin seed layer, that allows the resulting sensor to read recorded densities exceeding 60 Gb/in$^2$. In a second embodiment, the invention provides a method for forming a GMR symmetric dual spin valve sensor element utilizing the same novel, ultra-thin seed layer. The sensor elements so formed are extremely thin and have a high sensitivity and signal-to-noise ratio.

Experimental

The sensor configurations for both the single bottom spin valve and the dual symmetric spin valve were obtained after lengthy experimentation, during which the performance of many configurations were investigated and compared to the performance of reference configurations that were typical of the prior art. The results of the experiments yielded two broad conclusions: 1) the prior art NiCr seed layer with 40 atomic percent of Cr could advantageously be replaced by a NiCr seed layer with 31 atomic percent Cr, and 2) the typical prior art seed layer thickness of approximately 60 angstroms could, for the new seed layer, be advantageously replaced by a deposited thickness of approximately 30 angstroms. These two simple changes allowed a succession of changes in the remainder of the sensor, including the significant reduction in thickness of the MnPt antiferromagnetic pinning layer from the 100 angstroms typical of the best prior art sensors, to approximately 80 angstroms in the present invention. In addition, the synthetic antiferromagnetic tri-layer comprising two CoFe ferromagnetic layers of 15 and 20 angstroms respectively surrounding a Ru layer, could now be replaced by two CoFe layers of approximately 13 and 15 angstroms respectively. Not only did these reductions in thickness lead to a significantly thinner sensor suitable for high density recordings, but the sensor parameters of DR/R and DR improved significantly over those of prior art sensors. It was concluded that the approximately 30 angstrom thick novel seed layer allowed the significantly thinner MnPt and SyAF layer to yield a 50% higher pinning field than was obtained with a 60 angstrom prior art seed layer and thicker MnPt and SyAF layers. This is particularly desirable for an ultra-high density recording head because it produces a more robust head that is resistant to electrostatic discharge (ESD) damage.

The course of the experiment as it related to the single bottom spin valve configuration can be briefly described by referring to the four numbered configurations that follow. Two of these, (1 and 2), differed in that (1) used a prior art seed layer while (2) used the novel seed layer, but both used identical CoFeB/NiFe free layers and thicker SyAF layers. The remaining two, (3 and 4) differed in that (3) used the prior art seed layer while (4) used the seed layer of the invention, but they were different from (1 and 2) in that both used a CoFe/Cu free layer and thinner SyAF layer. After subjecting the configurations to a 10,000 Oe transverse field at 280° C. for 5 to fix the magnetization of the pinned layer, their values of $R_s$ (sheet resistance), DR and DR/R were measured. These values are tabulated below the configurations. The four numbered configurations are described in detail as follows:

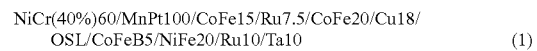

NiCr(40%)60/MnPt100/CoFe15/Ru7.5/CoFe20/Cu18/
OSL/CoFeB5/NiFe20/Ru10/Ta10     (1)

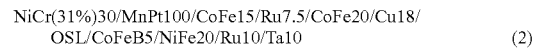

NiCr(31%)30/MnPt100/CoFe15/Ru7.5/CoFe20/Cu18/
OSL/CoFeB5/NiFe20/Ru10/Ta10     (2)

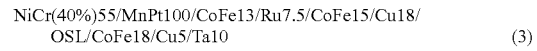

NiCr(40%)55/MnPt100/CoFe13/Ru7.5/CoFe15/Cu18/
OSL/CoFe18/Cu5/Ta10     (3)

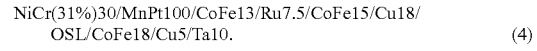

NiCr(31%)30/MnPt100/CoFe13/Ru7.5/CoFe15/Cu18/
OSL/CoFe18/Cu5/Ta10.     (4)

These four configurations produced the following values of $R_s$ (sheet resistance), DR/R and DR:

|      | $R_s$ | DR/R | DR   |
| ---- | ----- | ---- | ---- |
| (1): | 19.6  | 12.7 | 2.50 |
| (2): | 21.8  | 13.3 | 2.90 |
| (3)  | 21.8  | 14.8 | 3.24 |
| (4)  | 24.8  | 15.6 | 3.86 |

It can be seen that configuration (2) is an improvement on reference configuration (1), wherein both use the same CoFeB/NiFe free layer. Similarly, configuration (4) is an improvement over reference configuration (3), wherein both use the same CoFe/Cu free layer.

Corresponding experiments were carried out on the following five dual symmetric spin valve configurations. Configuration (1) is a reference configuration using the prior art seed layer at 55 angstroms thickness, a CoFe5/NiFe15/CoFe5 free layer and top and bottom MnPt pinning layers of 100 angstrom thickness. Configuration (2) uses the novel seed layer of the present invention at approximately 30 angstroms thickness and thinner top and bottom MnPt layers of approximately 80 and 70 angstroms respectively. Configuration (3) differs from (2) in that a CoFe/Cu free layer is used. Configuration (4) differs from (3) in that a CoFe5/NiFe15/CoFe3 free layer is used. Configuration (5) differs from (4) in that the bottom SyAF is CoFe15/Ru7.5/CoFe13 rather than CoFe13/Ru7.5/CoFe15.

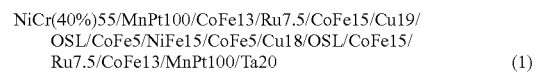

NiCr(40%)55/MnPt100/CoFe13/Ru7.5/CoFe15/Cu19/
OSL/CoFe5/NiFe15/CoFe5/Cu18/OSL/CoFe15/
Ru7.5/CoFe13/MnPt100/Ta20     (1)

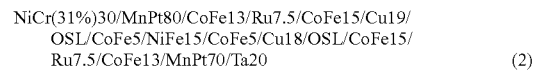

NiCr(31%)30/MnPt80/CoFe13/Ru7.5/CoFe15/Cu19/
OSL/CoFe5/NiFe15/CoFe5/Cu18/OSL/CoFe15/
Ru7.5/CoFe13/MnPt70/Ta20     (2)

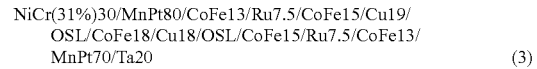

NiCr(31%)30/MnPt80/CoFe13/Ru7.5/CoFe15/Cu19/
OSL/CoFe18/Cu18/OSL/CoFe15/Ru7.5/CoFe13/
MnPt70/Ta20     (3)

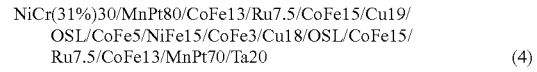

NiCr(31%)30/MnPt80/CoFe13/Ru7.5/CoFe15/Cu19/
OSL/CoFe5/NiFe15/CoFe3/Cu18/OSL/CoFe15/
Ru7.5/CoFe13/MnPt70/Ta20     (4)

NiCr(31%)30/MnPt80/CoFe15/Ru7.5/CoFe13/Cu19/
    OSL/CoFe5/NiFe15/CoFe3/Cu18/OSL/CoFe15/
    Ru7.5/CoFe13/MnPt70/Ta20                                    (5)

Tabulated below is the total thickness in angstroms, T, sheet resistance, $R_s$, DR/R, DR and Lambda (magnetostriction) for the three configurations.

|     | T   | $R_s$ | DR/R  | DR   | Lambda    |
| --- | --- | ----- | ----- | ---- | --------- |
| (1) | 413 | 12.5  | 12.9  | 1.61 | 5.40E−06  |
| (2) | 341 | 13.0  | 16.9  | 2.21 | 5.90E−06  |
| (3) | 330 | 14.6  | 18.7  | 2.73 | −2.50E−06 |
| (4) | 339 | 13.32 | 15.81 | 2.11 | 1.99E−06  |
| (5) | 339 | 13.32 | 15.81 | 2.11 | 1.99E−06  |

As can be seen, configurations (2)-(5) are not only substantially thinner than reference configuration (1), they show marked improvements in $R_s$, DR/R and DR. Configuration (4) is substantially similar to configuration (2), but was made to correct a magnetostriction (lambda) value that was not deemed optimum. Our experiments have shown that a magnetostriction value between +1.0E-06 and +3.0E-06 is optimum for a sensor's output performance. The configuration of (2) did not fall into this range. By changing slightly the thicknesses of the free layer, the lambda value in (4) was improved over that of (2) and configuration (4) becomes the configuration of choice. Finally, the essential difference between (4) and (5) is in the symmetry of their bottom and top SyAF layers relative to the central free layer. In configuration (4), there is mirror image symmetry and the net magnetic moment of both SyAF layers are in the same direction. In (5) there is translational symmetry, (Both SyAF layers are formed in the same order of their thicknesses) and their net magnetic moments become oppositely directed. The configuration of (4) is found to exhibit a very large exchange field and very little hysteresis. We conclude from these investigations that a configuration of type (4) will provide a symmetric dual spin valve structure meeting the objects of the present invention.

Construction

Referring first to FIG. 1, there is shown a schematic cross-sectional view of a bottom spin valve GMR sensor formed in accord with the method of the first embodiment of this invention. In accord with the method there is first provided a substrate (10). On the substrate there is then formed the novel seed layer (20) of this invention, which is a layer of NiCr having Ni of approximately 69 atomic percent and Cr of approximately 31 atomic percent. The seed layer is formed to a thickness between approximately 25 and 35 angstroms, with approximately 30 angstroms being preferred. Upon this seed layer there is then formed an antiferromagnetic pinning layer (30), which in this embodiment is a layer of MnPt formed to a thickness of between approximately 60 and 100 angstroms but where approximately 80 angstroms is preferred. On the pinning layer there is then formed a synthetic antiferromagnetic (SyAF) pinned layer (40) comprising a first ferromagnetic layer (42) on which is formed a non-magnetic antiferromagnetically coupling layer (44), on which is formed a second ferromagnetic layer (46). In this embodiment the first and second ferromagnetic layers are both layers of CoFe, with the first layer being approximately 13 angstroms thick and the second layer being approximately 15 angstroms thick. The non-magnetic coupling layer (44) is a layer of Ru approximately 7.5 angstroms thick. On the SyAF layer there is then formed a non-magnetic spacer layer (50), which in this embodiment is a Cu layer between approximately 15 and 20 angstroms thick, but where 18 angstroms thick is preferred and the surface of said spacer layer not contacting the SyAF layer is treated to form an oxygen surfactant layer (OSL), shown as a broken line (51). As mentioned above, the OSL is less than an atomic mono-layer of oxygen adsorbed on the Cu surface by placing the surface in contact with low-pressure oxygen.

On the OSL surface layer there is then formed a free layer (60), which can be either a composite layer of CoFe/NiFe or a layer of CoFe/Cu. In the case of CoFe/NiFe, the CoFe is formed to a thickness of between approximately 5 and 15 angstroms, but approximately 5 angstroms is preferred and the NiFe is formed to a thickness of between approximately 15 and 30 angstroms, but approximately 20 angstroms is preferred. In the case of CoFe/Cu, the CoFe is formed to a thickness of between approximately 15 and 25 angstroms, but approximately 18 angstroms is preferred and the Cu is formed to a thickness of between approximately 5 and 10 angstroms, but approximately 5 angstroms is preferred. On the free layer there is finally formed a capping layer (70). In the case of the CoFe/NiFe free layer, the capping layer is a bilayer comprising a layer of Ru on which is formed a layer of Ta. The Ru layer is formed between approximately 5 and 10 angstroms, but approximately 10 angstroms is preferred. The Ta layer is formed between approximately 10 and 30 angstroms, but approximately 10 angstroms is preferred. In the case of the CoFe/Cu free layer, the capping layer is a layer of Ta formed to a thickness of between approximately 10 and 30 angstroms, where approximately 10 angstroms is preferred. After forming the sensor as described above, it is subjected to a 5 hour anneal at a temperature of 280° C. in a 10,000 Oe magnetic field directed transversely to the plane of the figure. This anneal fixes the direction of the pinned (SyAF) layer. A separate anneal in an approximate 250 Oe field in the longitudinal direction for 30 min. at 250° C. sets the free layer magnetization.

Figure 2:
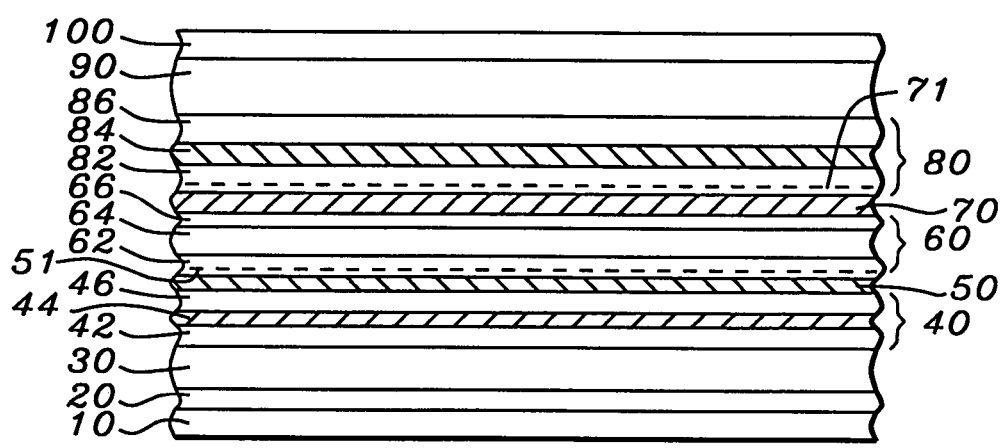
FIG. 2 is a schematic cross-sectional view of a symmetric dual spin valve sensor element formed in accord with a second embodiment of the method of the present invention.

Referring next to FIG. 2, there is shown a schematic cross-sectional view of a symmetric dual spin valve GMR head formed in accord with the second preferred embodiment of this invention. In accord with the method there is first provided a substrate (10). On the substrate there is then formed the novel seed layer (20) of this invention, which is a layer of NiCr having Ni of approximately 69 atomic percent and Cr of approximately 31 atomic percent. The seed layer is formed to a thickness between approximately 25 and 35 angstroms, but a thickness of approximately 30 angstroms is preferred. Upon this seed layer there is then formed a first antiferromagnetic pinning layer (30), which in this embodiment is a layer of MnPt formed to a thickness of between approximately 80 and 100 angstroms but where approximately 80 angstroms is preferred. On the pinning layer there is then formed a first synthetic antiferromagnetic (SyAF) pinned layer (40) comprising a first ferromagnetic layer (42) on which is formed a non-magnetic antiferromagnetically coupling layer (44), on which is formed a second ferromagnetic layer (46). In this embodiment the first and second ferromagnetic layers of the first SyAF are both layers of CoFe, with the first layer being formed between approximately 10 and 15 angstroms but where approximately 13 angstroms is preferred and the second layer being formed between approximately 12 and 20 angstroms, but where approximately 15 angstroms is preferred. The non-magnetic coupling layer (44) is a layer of Ru approximately 7.5 angstroms thick. On the first SyAF layer there is then formed a first non-magnetic spacer layer (50)

between approximately 15 and 20 angstroms thick, but which in this embodiment is a Cu layer approximately 19 angstroms thick. The surface of the spacer layer not contacting the SyAF layer is treated to form an oxygen surfactant layer (OSL), shown as a broken line (51). On the OSL surface layer is then formed a ferromagnetic free layer (60), which is a tri-layer of ferromagnetic materials preferably comprising a first CoFe layer (62) on which is formed a NiFe layer (64) on which is formed a second CoFe layer (66). The first CoFe layer (62) is formed to a thickness of between approximately 5 and 10 angstroms, but approximately 5 angstroms is preferred, the NiFe layer (64) is formed to a thickness of between approximately 10 and 20 angstroms, but approximately 15 angstroms is preferred and the second CoFe layer (66) is formed to a thickness between approximately 3 and 5 angstroms, but approximately 3 angstroms is preferred. On the free layer is then formed a second non-magnetic spacer layer (70) which in this embodiment is a layer of Cu of thickness between 15 and 20 angstroms, but where approximately 18 angstroms is preferred. The surface of the spacer layer not contacting the free layer is treated to form an oxygen surfactant layer (OSL), shown as a broken line (71). On the OSL of the spacer layer is then formed a second SyAF pinned layer (80) comprising a first ferromagnetic layer (82) on which is formed a non-magnetic antiferromagnetically coupling layer (84), on which is formed a second ferromagnetic layer (86). In this embodiment the first and second ferromagnetic layers of the second SyAF are both layers of CoFe, with the first layer being formed between approximately 12 and 20 angstroms, but where approximately 15 angstroms is preferred and the second layer being between approximately 10 and 15 angstroms thick, but where approximately 13 angstroms is preferred. The non-magnetic coupling layer (84) is a layer of Ru approximately 7.5 angstroms thick. On the second SyAF layer there is then formed a second antiferromagnetic pinning layer (90) which is a layer of MnPt formed to a thickness between approximately 60 and 100 angstroms but where 70 angstroms is preferred. Finally, a capping layer (100) is formed on the pinning layer, the capping layer being a layer of Ta formed to a thickness between approximately 10 and 30 angstroms, but where approximately 20 angstroms is preferred. After forming the sensor as described above, it is subjected to a 5 hour anneal at a temperature of 280° C. in a 10,000 Oe magnetic field directed transversely to the plane of the figure. This anneal fixes the direction of the pinned (SyAF) layer. A separate anneal in an approximate 250 Oe field in the longitudinal direction for 30 min. at 250° C. sets the free layer magnetization.

As is understood by a person skilled in the art, the preferred embodiments of the present invention are illustrative of the present invention rather than limiting of the present invention. Revisions and modifications may be made to materials, structures and dimensions provided in the single or dual spin valve GMR sensors with novel seed layers capable of reading recordings with ultra-high densities, while still providing the single or dual spin valve GMR sensors with novel seed layers capable of reading recordings with ultra-high densities in accord with the spirit and scope of the present invention as defined by the appended claims.

What is claimed is:

1. A symmetric dual spin valve sensor element with a novel seed layer and synthetic antiferromagnetic pinned layers comprising:

a substrate;
a NiCr seed layer formed on the substrate, the atomic percentage of Cr in said seed layer being approximately 31%;
a first antiferromagnetic pinning layer formed on said seed layer;
a first synthetic antiferromagnetic (SyAF) pinned layer formed on said first antiferromagnetic pinning layer;
a first non-magnetic spacer layer formed on said SyAF layer, the surface of said spacer layer not contacting said SyAF layer being treated to form an oxygen surfactant layer (OSL);
a ferromagnetic free layer formed on the OSL of said treated spacer layer;
a second non-magnetic spacer layer formed on said ferromagnetic free layer, the surface of said spacer layer not contacting said free layer being treated to form an oxygen surfactant layer (OSL);
a second synthetic antiferromagnetic (SyAF) pinned layer formed on the OSL of said second non-magnetic spacer layer;
a second antiferromagnetic pinning layer formed on said second SyAF layer;
a capping layer formed on said second antiferromagnetic pinning layer.

2. The element of claim 1 wherein the seed layer is between approximately 25 and 35 angstroms thick.

3. The element of claim 1 wherein the first antiferromagnetic pinning layer is a layer of MnPt formed to a thickness between approximately 60 and 100 angstroms.

4. The element of claim 1 wherein the first synthetic antiferromagnetic (SyAF) pinned layer comprises a first layer of CoFe between approximately 10 and 15 angstroms in thickness, on which is formed a Ru coupling layer of approximately 7.5 angstroms thickness, on which is formed a second layer of CoFe between approximately 10 and 20 angstroms thickness.

5. The element of claim 1 wherein the first non-magnetic spacer layer is a layer of Cu between approximately 15 and 20 angstroms thickness.

6. The element of claim 1 wherein the ferromagnetic free layer comprises a first layer of CoFe between approximately 5 and 10 angstroms thick on which is formed a layer of NiFe between approximately 10 and 20 angstroms thick on which is formed a second layer of CoFe between approximately 3 and 5 angstroms thick.

7. The element of claim 1 wherein the second non-magnetic spacer layer is a layer of Cu of between approximately 15 and 20 angstroms thick.

8. The element of claim 1 wherein the second synthetic antiferromagnetic pinned layer comprises a first layer of CoFe between approximately 10 and 20 angstroms thick, on which is formed a Ru coupling layer of approximately 7.5 angstroms thickness, on which is formed a second layer of CoFe between approximately 10 and 15 angstroms thick.

9. The element of claim 1 wherein the second antiferromagnetic pinning layer is a layer of MnPt formed to a thickness between approximately 60-100 angstroms.

10. The element of claim 1 wherein the capping layer is a layer of Ta between approximately 10 and 30 angstroms thick.

* * * * *